United States Patent
McCleary

(10) Patent No.: US 7,170,555 B1
(45) Date of Patent: Jan. 30, 2007

(54) CROSS-TALK ADJUSTMENT IN ELECTRONIC IMAGING DEVICES

(75) Inventor: Brent McCleary, Chino Hills, CA (US)

(73) Assignee: ESS Technology, Inc., Fremont, CA (US)

( * ) Notice: Subject to any disclaimer, the term of this patent is extended or adjusted under 35 U.S.C. 154(b) by 766 days.

(21) Appl. No.: 10/417,310

(22) Filed: Apr. 15, 2003

Related U.S. Application Data

(60) Provisional application No. 60/376,690, filed on Apr. 30, 2002.

(51) Int. Cl.
*H04N 5/217* (2006.01)
(52) U.S. Cl. .............. 348/241; 348/308; 348/706
(58) Field of Classification Search ............. 348/241, 348/222.1, 308, 706
See application file for complete search history.

(56) References Cited

U.S. PATENT DOCUMENTS 6,686,961 B1 * 2/2004 Kubo et al. ............... 348/297
7,016,089 B1 * 3/2006 Yoneda et al. ............ 348/310

\* cited by examiner

*Primary Examiner*—Vivek Srivastava
*Assistant Examiner*—Gevell Selby
(74) *Attorney, Agent, or Firm*—Farjami & Farjami LLP

(57) ABSTRACT

An electronic imaging device includes a photosensor having a plurality of photodetectors in an array structure, and a processor in signal communication with the photodetectors. The processor is operable to cross-talk adjust a signal from a photodetector based upon the value of the signal from that photodetector and signals from photodetectors adjoining that photodetector.

43 Claims, 10 Drawing Sheets

| | | | | | | | | | |
|---|---|---|---|---|---|---|---|---|---|
| G | R | G | R | G | R | G | . | . | . |
| B | G | B | G | B | G | B | . | . | . |
| G | R | G | R | G | R | G | . | . | . |
| B | G | B | G | B | G | B | . | . | . |
| G | R | G | R | G | R | G | . | . | . |
| B | G | B | G | B | G | B | . | . | . |
| . | . | . | . | . | . | . | | | |
| . | . | . | . | . | . | . | | | |
| . | . | . | . | . | . | . | | | |

FIG. 3

CROSS-TALK ADJUSTMENT IN ELECTRONIC IMAGING DEVICES

The present application claims the benefit of U.S. provisional application Ser. No. 60/376,690, filed Apr. 30, 2002, which is hereby fully incorporated by reference in the present application.

BACKGROUND OF THE INVENTION

1. Technical Field

This invention relates generally to electronic imaging devices, and more particularly, to a system that reduces the effects of cross-talk in electronic imaging devices.

2. Related Art

Electronic imaging devices, or imagers, have broad applications in many areas such as in the commercial, consumer, industrial, medical, defense and scientific fields. The electronic imaging devices convert a received optical image, such as an image of an object, into a signal corresponding to the received image. A typical electronic imaging device includes a photosensor to sense the received optical image.

Photosensors in electronic imaging devices are typically formed of an array structure, with rows and columns, of photodetectors (such as photodiodes, photoconductors, photocapacitors and photogates) that generate photo-charges corresponding to the light radiation received by each respective photodetector. The photo-charges are created by photons striking the surface of the photodetectors, which are typically constructed of an appropriate semiconductor material. As photons strike the surface of a photodetector, free charge carriers (i.e. electron-hole pairs) are generated in an amount proportional to the incident photon radiation upon the photodetector. A signal is then generated corresponding to the amount of that incident photon radiation. The collective signals from each respective photodetector may then be utilized as desired, such as for displaying or electronically storing a corresponding image or for providing particular relevant information regarding the image.

During operation, an undesirable phenomenon generally termed as 'cross-talk' occurs among adjoining or adjoining photodetectors in a photosensor. Because of this phenomenon, some photo-charges leak from a photodetector to adjoining photodetectors, and influence (i.e. corrupt) the signals generated by the adjoining photodetectors. Similarly, the photodetector also receives some cross-talk photo-charges from its adjoining photodetectors. Such cross-talk, therefore, undesirably corrupts the signals generated by a photodetector during operation of the corresponding electronic imaging device. Depending on the particular environment in which the electronic imaging device is being used, such inaccuracies can be significant, and sometimes even dangerous. For example, in an electronic imaging device used in a medical environment, such as when a surgeon performs micro-surgery on a patient with the assistance of an electronic imaging device, corrupted signals from the electronic imaging device may blur the image presented to the surgeon. The blurred image can impact the surgeon's performance during the surgical procedure, which can result in dangerous errors during the surgery.

To further complicate matters, cross-talk is unpredictable because the amount of cross-talk typically varies continuously depending upon the amount of incident photon radiation upon the surface of the particular photodetector, the wavelength of the light comprising that incident photon radiation, and the like. Therefore, the amount of cross-talk typically lacks a precise predictable order. Furthermore, the spatial location of the photodetectors with respect to each other also contributes to the amount of cross-talk in a particular photosensor. Typically, the amount of cross-talk decreases with an increase in the distance between adjacent photodetectors. All these variables add to the indefiniteness and unpredictability of cross-talk among adjoining photodetectors during the operation of an electronic imaging device.

Efforts to adjust cross-talk in electronic imaging devices have not been entirely successful. Systems designed for adjusting cross-talk are only somewhat effective because they tend to utilize a predetermined formula for cross-talk adjusting the value of the signals from the photodetectors. Many significant variables, such as the amount of light incident upon the photodetector, its wavelength, the amount of light incident upon adjoining photodetectors, its wavelength, the distance of the photodetector from the adjoining photodetectors, and the like, tend to be overlooked. Such systems, therefore, are not fully effective in adjusting cross-talk in signals from photodetectors in electronic imaging devices.

It is, therefore, desirable to provide an improved system for reducing the effects of cross-talk in signals from photodetectors in an electronic imaging device. More particularly, there is a need for an improved system that more accurately adjusts the effects of cross-talk in photodetector signals, which includes taking into consideration the amount of incident photon radiation upon a particular photodetector, the wavelength of the incident photon radiation upon that photodetector, the amount of incident photon radiation upon adjoining photodetectors, the wavelength of the incident photon radiation upon those adjoining photodetectors, and the like. Accordingly, this invention is directed to overcoming one or more of the problems set forth above.

SUMMARY OF THE INVENTION

A system and method to adjust the effects of cross-talk in signals from photodetectors in an electronic imaging device is disclosed. A photodetector has at least one adjacent photodetector, and a cross-talk adjustment device is in signal communication with the photodetector and the adjacent photodetector. The cross-talk adjustment device is operable to cross-talk adjust a signal from the photodetector based on at least the signal from the photodetector and a signal from the adjacent photodetector.

Other systems, methods, features and advantages of the invention will be or will become apparent to one skilled in the art upon examination of the following figures and detailed description. It is intended that all such additional systems, methods, features and advantages be included within this description, be within the scope of the invention, and be covered by the accompanying claims.

BRIEF DESCRIPTION OF THE FIGURES

The components in the figures are not necessarily to scale, emphasis instead being placed upon illustrating the principles of the invention. Moreover, in the figures, like reference numerals designate corresponding parts throughout the different views.

FIG. 3 is a map of the respective colors of filtered light received by each photodetector in an array of photodetectors in one example implementation of the electronic imaging device of FIG. 1.

DETAILED DESCRIPTION OF THE PREFERRED EMBODIMENTS

Figure 1:
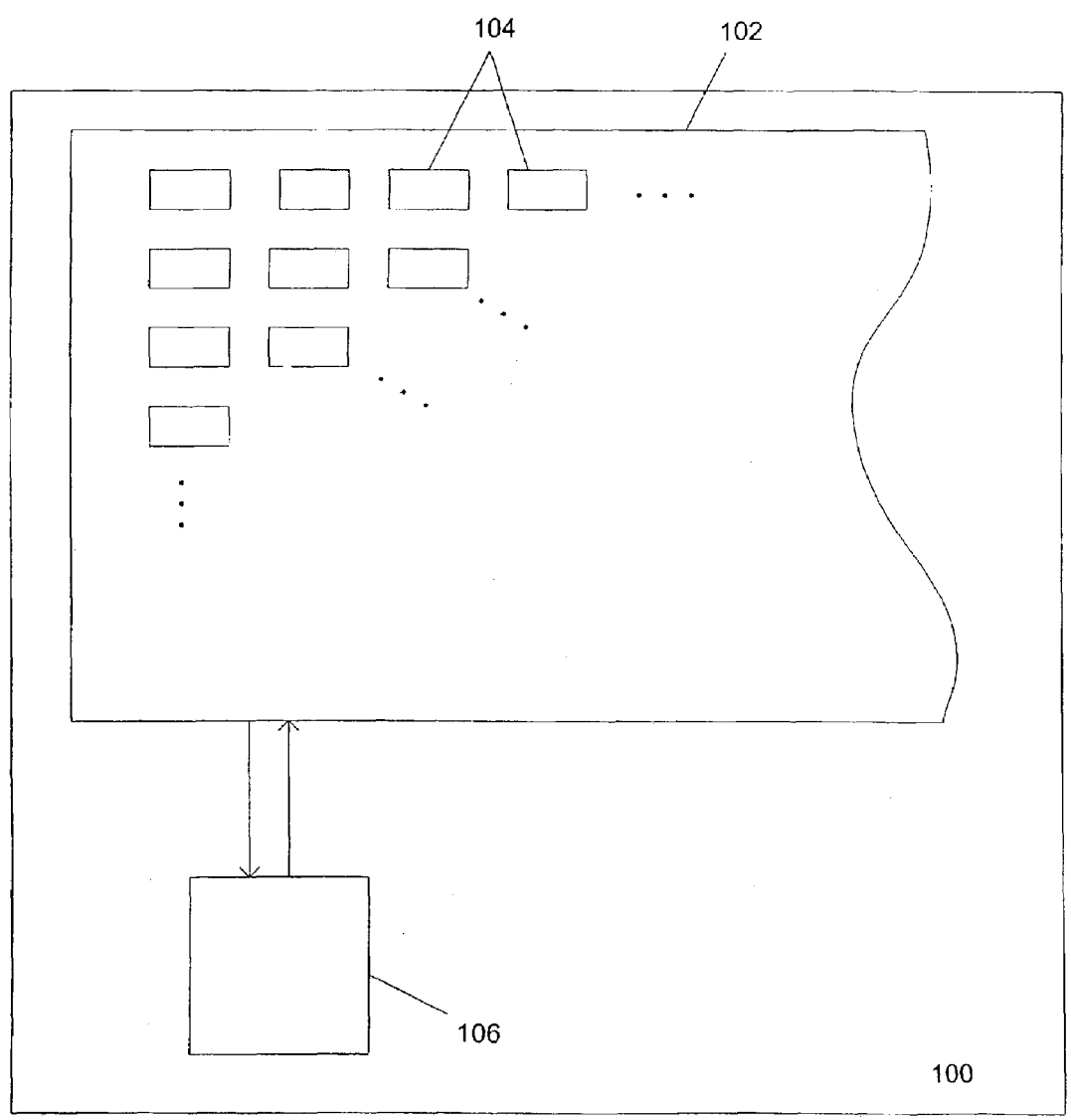
FIG. 1 is a plan view of a photosensor and an associated processing device in an electronic imaging device, with the photosensor including a plurality of photodetectors positioned in an array structure.

Referring to FIG. 1, a photosensor 102 in an electronic imaging device 100, or imager, according to the invention includes a plurality of photodetectors 104 positioned in an array structure. Each photodetector 104 is typically designed to sense incident photon radiation that strikes its surface, and to generate a signal corresponding to such incident photon radiation. Depending upon the particular implementation, photodetectors 104 may be photodiodes, photoconductors, photocapacitors, photogates, or any other device known in the art for detecting or sensing photon radiation. The signals generated are communicated to a processor 106, which is a device for processing signals, such as a microprocessor.

Figure 2:
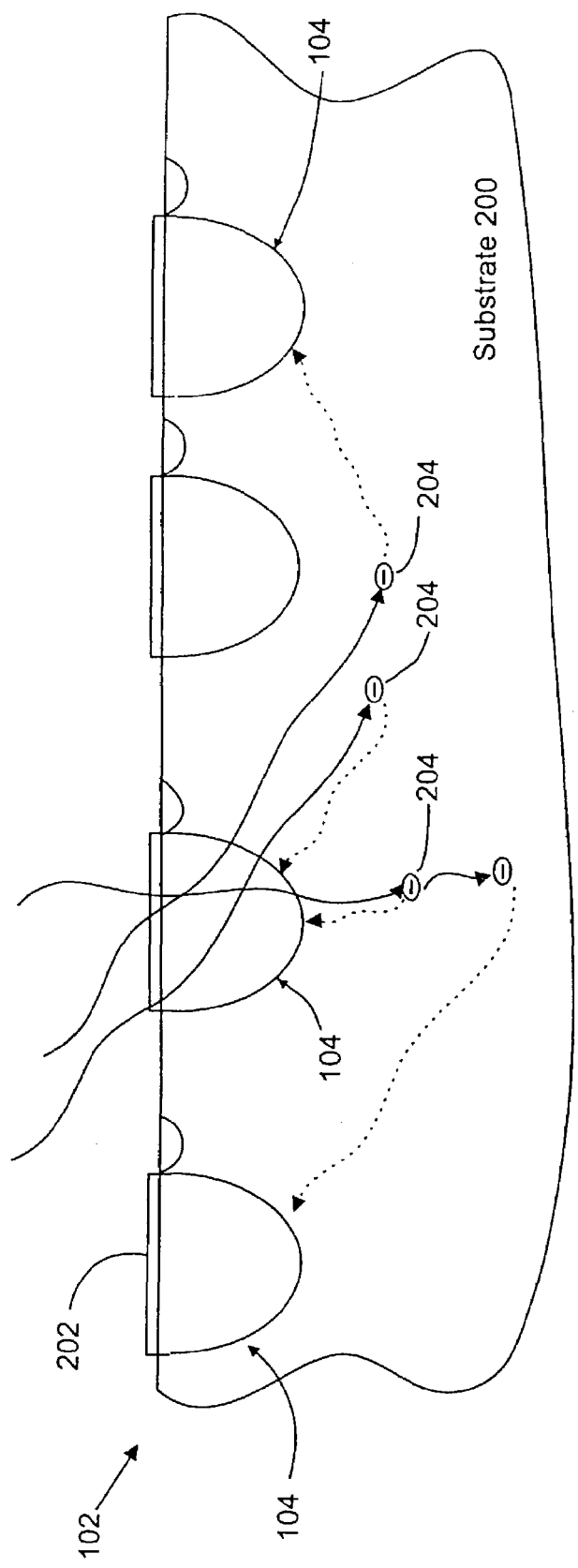
FIG. 2 is a cross sectional view of the photosensor of FIG. 1 illustrating incident photon radiation striking the surface of photodetectors and cross-talk occurring between adjacent photodetectors.

Referring to FIG. 2, a cross sectional view of the electronic imaging device of FIG. 1 is shown illustrating incident photon radiation striking the surface of adjacent photodetectors, and cross-talk occurring between adjacent photodetectors. Photosensor 102 includes a plurality of photodetectors 104. Each photodetector 104 in the array of photodetectors is formed of an appropriate semiconductor material in a substrate layer 200. It is recognized and anticipated that the invention will be applicable with all types of semiconductor electronic imaging devices, including charge coupled devices (CCD), charge injection devices (CID), complimentary metal oxide semiconductor (CMOS) electronic imaging devices, and the like. Accordingly, the particular semiconductor material of the device will vary according to the particular implementation of the invention. Each photodetector 104 will typically be associated with a filter 202 to allow only one specific color, or wavelength, of light to be received by the photodetector 104, whereby all other colors of light will be filtered out by filter 202. As shown in FIG. 2, photons that pass through filter 202 generate an electron-hole pair 204. Some photons, however, manage to flow through to adjoining photodetectors and generating an electron-hole pair, thereby resulting in undesired cross-talk between adjacent photodetectors.

Since photodetectors 104 in photosensor 100 are typically arranged in an array structure including rows and columns, color filters 202 on the photodetectors 104 are implemented in a predetermined pattern designed to achieve the most desirable results from photosensor 102. A predetermined pattern of color filters 202 on an array of photodetectors 104 in one implementation is shown in FIG. 3. Each filter permits light of one of only three colors, red (R), green (G) or blue (B), to pass through to its respective photodetector 104. As shown, the number of green colored filters is twice as many as either red or blue colored filters. However, it is recognized and anticipated that any pattern may be utilized including filtering light of any ratio of the colors, and the invention may be modified to, adapt to that particular pattern.

In the implementation shown in FIG. 3, cross-talk adjustment is performed for each photodetector utilizing a method designed for the purpose. The particular method utilized for a particular photodetector will typically depend upon the color of light that the photodetector senses and the measured values of the signal from the particular photodetector and signals from other photodetectors adjacent to that photodetector. For example, in the implementation shown in FIG. 3, the method for adjusting cross-talk in the photodetectors sensing red light is:

$R_{adjusted} = (R_{measured} - (G_{horz}*GL + G_{horz}*GR + G_{vert}*GU + G_{vert}*GD + B_{diag}*BLD + B_{diag}*BRD + B_{diag}*BLU + B_{diag}*BRU))/(1 - (2*R_{horz} + 2*R_{vert} + 4*R_{diag}))$ wherein $R_{adjusted}$ is the cross-talk adjusted value of a signal generated by a photodetector sensing red light.

In the method above, $R_{measured}$ is the actual measured value of the signal from the corresponding photodetector sensing red light. This value will include any cross-talk corruption that may have occurred when the photodetector sensed the incident photon radiation upon the photodetector consisting of red light. $G_{horz}$ is the percentage of photocharges from photodetectors sensing green light that travel in the horizontal direction. The value of $G_{horz}$ may be determined in any one of various ways. For example, in one implementation the value of $G_{horz}$ is determined statistically, whereby the value is a predetermined fixed value that is utilized in the method. In another implementation, the value of $G_{horz}$ may be determined by a calibration procedure performed during the initial startup of the corresponding electronic imaging device. During the calibration process, a red light may be delivered to the photodetector sensing red light at issue. Simultaneously, signals from the photodetectors sensing green light positioned horizontally with respect to the photodetector sensing red light are measured. The value of those measured signals will indicate the amount of cross-talk that occurred, and this value will yield a calibrated value of $G_{horz}$ for use in the method for subsequent determinations of $R_{adjusted}$. In yet another implementation, the value of $G_{horz}$ may be calibrated or determined periodically, and the most recently determined value may be utilized in the method.

Figure 4:
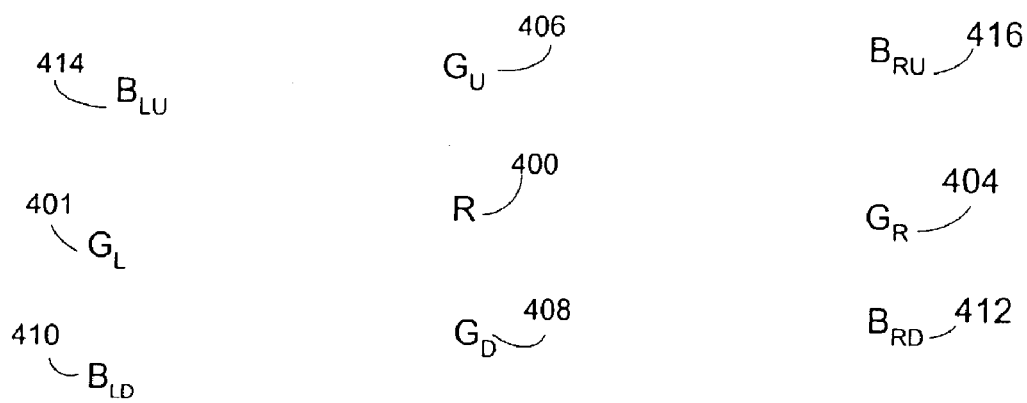
FIG. 4 is a map of the labels provided to photodetectors adjacent a photodetector sensing red light in the map of FIG. 3.

GL is the actual measured value of a photodetector sensing green light to the left of the photodetector at issue, i.e. the photodetector sensing red light. A map of the placement of a photodetector R 400 sensing red light and adjacent photodetectors with respect to photodetector R 400 is illustrated in FIG. 4. The map illustrates the position of a photodetector labeled $G_L$ 402 with respect to photodetector R 400. $G_L$ 402 is the photodetector sensing green light to the left of, or west of, the photodetector R 400 sensing red light. Similarly, GR is the actual measured value of the photodetector sensing green light to the right of, or east of, photodetector R 400. The position of that photodetector, labeled $G_R$ 404, with respect to photodetector R 400 is also shown in FIG. 4.

$G_{vert}$ is the percentage of photocharges from photodetectors sensing green light that travel in the vertical direction. The value of $G_{vert}$ may also be determined in any one of various ways, such as statistically or with a calibration procedure. GU is the measured value of a photodetector $G_U$ 406 sensing green light to the north of photodetector R 400 as shown in the map of FIG. 4. Similarly, GD is the measured value of a photodetector $G_D$ 408 sensing green light to the south of photodetector R 400 as shown in the map of FIG. 4.

$B_{diag}$ is the percentage of photocharges from photodetectors sensing blue light that travel in the diagonal direction. The value of $B_{diag}$ may also be determined in any one of various ways, such as statistically or by a calibration procedure. BLD is the measured value of a photodetector, labeled $B_{LD}$ 410, sensing blue light to the south-west of photodetector R 400 as shown in the map of FIG. 4. Similarly, BRD is the measured value of a photodetector labeled $B_{RD}$ 412 sensing blue light to the south-east of photodetector R 400 as shown in the map of FIG. 4. BLU and BRU are the measured values of photodetectors labeled $B_{LU}$ 414 and $B_{RU}$ 416 respectively in the map of FIG. 4. As shown, photodetectors $B_{LU}$ 414 and $B_{RU}$ 416 are positioned to the north-west and north-east, respectively, of photodetector R 400.

$R_{horz}$, $R_{vert}$ and $R_{diag}$ are the percentage of photocharges from photodetectors sensing red light that travel in the horizontal, vertical and diagonal directions respectively. Their values may also be determined in any one of various ways, such as statistically or by a calibration method.

Based on the respective values of the variables, an adjusted value of a photodetector sensing red light may be determined by the $R_{adjusted}$ method provided. In the method, the measured value of the photodetector labeled R is determined. From this value, a cross-talk gain factor is subtracted. The cross-talk gain factor includes horizontal cross-talk gain interference, vertical cross-talk gain interference and diagonal cross-talk gain interference. Horizontal cross-talk gain interference includes the percentage of photocharges from photodetectors sensing a particular color of light, such as green light, that travel in the horizontal direction multiplied by each of the measured values of the photodetector sensing that particular color of light to the west of the photodetector sensing red light, and the photodetector sensing that particular color of light to the east of the photodetector sensing red light. The vertical cross-talk gain interference includes the percentage of photocharges from photodetectors sensing a particular color of light, such as green light, that travel in the vertical direction multiplied by each of the measured values of the photodetector sensing that particular color of light to the north of the photodetector sensing red light, and the photodetector sensing that particular color of light to the south of the photodetector sensing red light. The diagonal cross-talk gain interference includes the percentage of photocharges from photodetectors sensing a particular color of light, such as blue light, that travel in the diagonal direction multiplied by each of the measured values of the photodetector sensing that particular color of light to the south-west of the photodetector sensing red light, the photodetector sensing that particular color of light to the south-east of the photodetector sensing red light, the photodetector sensing that particular color of light to the north-west of the photodetector sensing red light, and the photodetector sensing that particular color of light to the north-east of the photodetector sensing red light.

A value obtained by subtracting the cross-talk gain factor from the measured value of the photodetector sensing red light is factored by a cross-talk loss normalization factor. The cross-talk loss normalization factor comprises of the sum of a horizontal cross-talk loss factor, a vertical cross-talk loss factor and a diagonal cross-talk loss factor, subtracted from 1. The horizontal cross-talk loss factor is twice the value of the percentage of photocharges from photodetectors sensing red light that travel in the horizontal direction. The vertical cross-talk loss factor is twice the value of the percentage of photocharges from photodetectors sensing red light that travel in the vertical direction. The diagonal cross-talk loss factor is four times the value of the percentage of photocharges from photodetectors sensing red light that travel in the diagonal direction. The cross-talk adjusted value thus obtained after factoring by the cross-talk loss normalization factor is the final cross-talk adjusted value for the signal from the photodetector sensing red light.

Accordingly, a signal generated by a photodetector sensing red light may be cross-talk adjusted to yield an improved signal indicative of the incident photon radiation upon the photodetector.

Similarly, in the implementation shown in FIG. 3, the method for adjusting cross-talk in the photodetectors sensing blue light is:

$$B_{adjusted} = (B_{measured} - (G_{horz}*GL + G_{horz}*GR + G_{vert}*GU + G_{vert}*GD + R_{diag}*RLD + R_{diag}*RRD + R_{diag}*RLU + R_{diag}*RRU))/(1 - (2*B_{horz} + 2*B_{vert} + 4*B_{diag}))$$

where $B_{adjusted}$ is the cross-talk adjusted value of a signal generated by a photodetector sensing blue light. In this method, $B_{measured}$ is the actual measured value of the signal from the corresponding photodetector sensing blue light. This value will include any cross-talk corruption that may have occurred when the photodetector sensed the incident photon radiation consisting of blue light.

Figure 5:
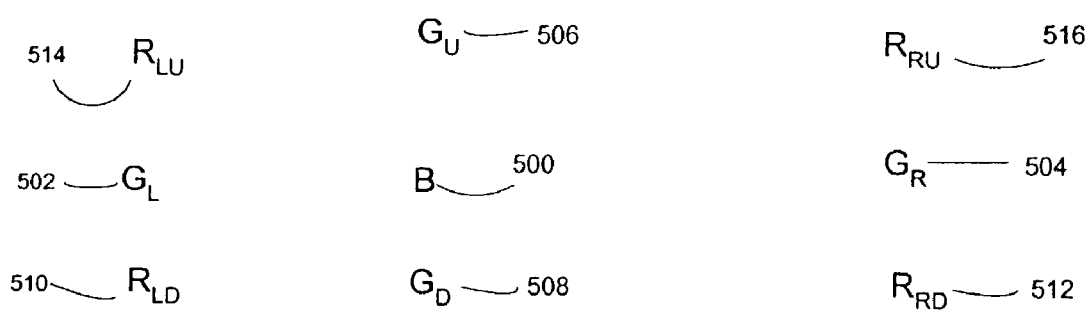
FIG. 5 is a map of the labels provided to photodetectors adjacent a photodetector sensing green light in an even row in the map of FIG. 3.

$G_{horz}$ is the percentage of photocharges from photodetectors sensing green light that travel in the horizontal direction. The value of $G_{horz}$ may be determined in any one of various ways, such as statistically or by a calibration process. GL is the actual measured value of a photodetector sensing green light to the left of the photodetector at issue, i.e. the photodetector sensing blue light. A map of the placement of a photodetector B 500 sensing blue light and adjoining photodetectors with respect to it is shown in FIG. 5. The map illustrates the position of a photodetector labeled $G_L$ 502 with respect to photodetector B 500. $G_L$ 502 is the photodetector sensing green light to the left of, or west of, the photodetector B 500 sensing blue light. Similarly, GR is the actual measured value of the photodetector sensing green light to the right of, or east of, photodetector B 500. The position of that photodetector, labeled $G_R$ 504, with respect to photodetector B 500 is also shown in FIG. 5.

$G_{vert}$ is the percentage of photocharges from photodetectors sensing green light that travel in the vertical direction. The value of $G_{vert}$ may be determined in any one of various ways, such as statistically or by a calibration process. GU is the measured value of a photodetector $G_U$ 506 sensing green light to the north of photodetector B 500 as shown in the map of FIG. 5. Similarly, GD is the measured value of a photodetector $G_D$ 508 sensing green light to the south of photodetector B 500 as shown in the map of FIG. 5.

$R_{diag}$ is the percentage of photocharges from photodetectors sensing red light that travel in the diagonal direction. The value of $R_{diag}$ may also be determined in any one of various ways, such as statistically or by a calibration procedure. RLD is the measured value of a photodetector, labeled $R_{LD}$ 510, sensing red light to the south-west of photodetector B 500 as shown in the map of FIG. 5. Similarly, RRD is the measured value of a photodetector labeled $R_{RD}$ 512 sensing red light to the south-east of photodetector B 500 as shown in the map of FIG. 5. RLU and RRU are the measured values of photodetectors labeled $R_{LU}$ 514 and $R_{RU}$ 516 respectively in the map of FIG. 5. As shown, photodetectors $R_{LU}$ 514 and $R_{RU}$ 516 are positioned to the north-west and north-east, respectively, of photodetector B 500.

$B_{horz}$, $B_{vert}$ and $B_{diag}$ are the percentage of photocharges from photodetectors sensing blue light that travel in the horizontal, vertical and diagonal directions respectively. Their values may also be determined in any one of various ways, such as statistically or by a calibration process.

Based on the respective values of the variables, an adjusted value of a photodetector sensing blue light may be determined by the $B_{adjusted}$ method provided. In the method, the measured value of the photodetector labeled B is determined. From this value, a cross-talk gain factor is subtracted. The cross-talk gain factor includes horizontal cross-talk gain interference, vertical cross-talk gain interference and diagonal cross-talk gain interference. Horizontal cross-talk gain interference includes the percentage of photocharges from photodetectors sensing a particular color of light, such as green light, that travel in the horizontal direction multiplied by each of the measured values of the photodetector sensing that particular color of light to the west of the photodetector sensing blue light, and the photodetector sensing that particular color of light to the east of the photodetector sensing blue light. The vertical cross-talk gain interference includes the percentage of photocharges from photodetectors sensing a particular color of light, such as green light, that travel in the vertical direction multiplied by each of the measured values of the photodetector sensing that particular color of light to the north of the photodetector sensing blue light, and the photodetector sensing that particular color of light to the south of the photodetector sensing blue light. The diagonal cross-talk gain interference includes the percentage of photocharges from photodetectors sensing a particular color of light, such as red light, that travel in the diagonal direction multiplied by each of the measured values of the photodetector sensing that particular color of light to the south-west of the photodetector sensing blue light, the photodetector sensing that particular color of light to the south-east of the photodetector sensing blue light, the photodetector sensing that particular color of light to the north-west of the photodetector sensing blue light, and the photodetector sensing that particular color of light to the north-east of the photodetector sensing blue light.

A value obtained by subtracting the cross-talk gain factor from the measured value of the photodetector sensing blue light is factored by a cross-talk loss normalization factor. The cross-talk loss normalization factor comprises of the sum of a horizontal cross-talk loss factor, a vertical cross-talk loss factor and a diagonal cross-talk loss factor, subtracted from 1. The horizontal cross-talk loss factor is twice the value of the percentage of photocharges from photodetectors sensing blue light that travel in the horizontal direction. The vertical cross-talk loss factor is twice the value of the percentage of photocharges from photodetectors sensing blue light that travel in the vertical direction. The diagonal cross-talk loss factor is four times the value of the percentage of photocharges from photodetectors sensing blue light that travel in the diagonal direction. The cross-talk adjusted value thus obtained after factoring by the cross-talk loss normalization factor is the final cross-talk adjusted value for the signal from the photodetector sensing blue light.

Accordingly, a signal generated by a photodetector sensing blue light may be cross-talk adjusted to yield an improved signal indicative of the incident photon radiation upon the photodetector.

Similarly, a method to adjust the effects of cross-talk in signals from photodetectors sensing green light may also be determined. In one implementation, there are two methods for adjusting cross-talk in photodetectors sensing green light, one method for photodetectors sensing green light in even rows of the array shown in FIG. 3, and one method for photodetectors sensing green light in odd rows of the array.

In the implementation shown in FIG. 3, the method for adjusting cross-talk in the photodetectors sensing green light in even rows is:

$G_{eadjusted} = (G_{emeasured} - (B_{horz}*BL + B_{horz}*BR + R_{vert}*RU + R_{vert}*RD + G_{diag}*GLD + G_{diag}*GRD + G_{diag}*GLU + G_{diag}*GRU))/(1-(2*G_{horz}+2*G_{vert}+4*G_{diag}))$ wherein $G_{eadjusted}$ is the cross-talk adjusted value of a signal generated by a photodetector sensing green light in even rows of the array shown in FIG. 3. In this method, $G_{emeasured}$ is the actual measured value of the signal from the corresponding photodetector sensing green light. This value will include any cross-talk corruption that may have occurred when the photodetector sensed the incident photon radiation consisting of green light.

Figure 6:
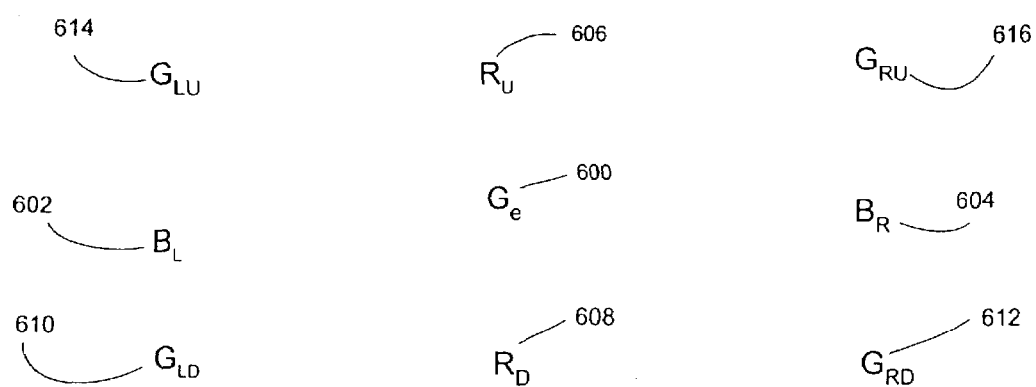
FIG. 6 is a map of the labels provided to photodetectors adjacent a photodetector sensing green light in an odd row in the map of FIG. 3.

$B_{horz}$ is the percentage of photocharges from photodetectors sensing blue light that travel in the horizontal direction. The value of $B_{horz}$ may be determined in any one of various ways, such as statistically or by a calibration process. BL is the actual measured value of a photodetector sensing blue light to the left of the photodetector at issue, i.e. the photodetector sensing green light in an even row of the array shown in FIG. 3. A map of the placement of a photodetector $G_e$ 600 sensing green light and adjoining photodetectors with respect to it is illustrated in FIG. 6. The map illustrates the position of a photodetector labeled BL 602 with respect to photodetector $G_e$ 600. BL 602 is the photodetector sensing blue light to the left of, or west of, the photodetector $G_e$ 600 sensing green light. Similarly, BR is the actual measured value of the photodetector sensing blue light to the right of, or east of, photodetector $G_e$ 600. The position of that photodetector, labeled BR 604, with respect to photodetector $G_e$ 600 is also shown in FIG. 6.

$R_{vert}$ is the percentage of photocharges from photodetectors sensing red light that travel in the vertical direction. The value of $R_{vert}$ may also be determined in any one of various ways, such as statistically or by a calibration process. RU is the measured value of a photodetector $R_U$ 606 sensing red light to the north of photodetector $G_e$ 600 as shown in the map of FIG. 6. Similarly, RD is the measured value of a photodetector $R_D$ 608 sensing red light to the south of photodetector $G_e$ 600 as shown in the map of FIG. 6.

$G_{diag}$ is the percentage of photocharges from photodetectors sensing green light that travel in the diagonal direction. The value of $G_{diag}$ may also be determined in any one of various ways, such as statistically or by a calibration procedure. GLD is the measured value of a photodetector, labeled $G_{LD}$ 610, sensing green light to the south-west of photodetector $G_e$ 600 as shown in the map of FIG. 6. Similarly, GRD is the measured value of a photodetector labeled $G_{RD}$ 612 sensing green light to the south-east of photodetector $G_e$ 600 as shown in the map of FIG. 6. GLU and GRU are the measured values of photodetectors labeled $G_{LU}$ 614 and $G_{RU}$ 616 respectively in the map of FIG. 6. As shown, photodetectors $G_{LU}$ 614 and $G_{RU}$ 616 are positioned to the north-west and north-east, respectively, of photodetector $G_e$ 600.

$G_{horz}$, $G_{vert}$ and $G_{diag}$ are the percentage of photocharges from photodetectors sensing green light that travel in the horizontal, vertical and diagonal directions respectively. Their values may also be determined in any one of various ways, such as statistically or by a calibration process.

Based on the respective values of the variables, an adjusted value of a photodetector sensing green light in an even row of the array shown in FIG. 3 may be determined by the $G_{eadjusted}$ method provided. In the method, the measured value of the photodetector labeled $G_e$ is determined. From this value, a cross-talk gain factor is subtracted. The cross-talk gain factor includes horizontal cross-talk gain interference, vertical cross-talk gain interference and diagonal cross-talk gain interference. Horizontal cross-talk gain interference includes the percentage of photocharges from photodetectors sensing a particular color of light, such as blue light, that travel in the horizontal direction multiplied by each of the measured values of the photodetector sensing that particular color of light to the west of the photodetector sensing green light in an even row, and the photodetector sensing that particular color of light to the east of the photodetector sensing green light in an even row. The vertical cross-talk gain interference includes the percentage of photocharges from photodetectors sensing a particular color of light, such as red light, that travel in the vertical direction multiplied by each of the measured values of the photodetector sensing that particular color of light to the north of the photodetector sensing green light in an even row, and the photodetector sensing that particular color of light to the south of the photodetector sensing green light in an even row. The diagonal cross-talk gain interference includes the percentage of photocharges from photodetectors sensing a particular color of light, such as green light, that travel in the diagonal direction multiplied by each of the measured values of the photodetector sensing that particular color of light to the south-west of the photodetector sensing green light in an even row, the photodetector sensing that particular color of light to the south-east of the photodetector sensing green light in an even row, the photodetector sensing that particular color of light to the north-west of the photodetector sensing green light in an even row, and the photodetector sensing that particular color of light to the north-east of the photodetector sensing green light in an even row.

A value obtained by subtracting the cross-talk gain factor from the measured value of the photodetector sensing green light in an even row is factored by a cross-talk loss normalization factor. The cross-talk loss normalization factor comprises of the sum of a horizontal cross-talk loss factor, a vertical cross-talk loss factor and a diagonal cross-talk loss factor, subtracted from 1. The horizontal cross-talk loss factor is twice the value of the percentage of photocharges from photodetectors sensing green light that travel in the horizontal direction. The vertical cross-talk loss factor is twice the value of the percentage of photocharges from photodetectors sensing green light that travel in the vertical direction. The diagonal cross-talk loss factor is four times the value of the percentage of photocharges from photodetectors sensing green light that travel in the diagonal direction. The cross-talk adjusted value thus obtained after factoring by the cross-talk loss normalization factor is the final cross-talk adjusted value for the signal from the photodetector sensing green light in an even row.

Accordingly, a signal generated by a photodetector sensing green light in an even row may be cross-talk adjusted to yield an improved signal indicative of the incident photon radiation upon the photodetector.

In the implementation shown in FIG. 3, the method for adjusting cross-talk in the photodetectors sensing green light in odd rows is:

$G_{oadjusted} = (G_{omeasured} - (R_{horz}*RL + R_{horz}*RR + B_{vert}*BU + B_{vert}*BD + G_{diag}*GLD + G_{diag}*GRD + G_{diag}*GLU + G_{diag}*GRU)/(1 - (2*G_{horz} + 2*G_{vert} + 4*G_{diag}))$ where $G_{oadjusted}$ is the cross-talk adjusted value of a signal generated by a photodetector sensing green light in odd rows of the array shown in FIG. 3. In this method, $G_{omeasured}$ is the actual measured value of the signal from the corresponding photodetector sensing green light. This value will include any cross-talk corruption that may have occurred when the photodetector sensed the incident photon radiation consisting of green light.

Figure 7:
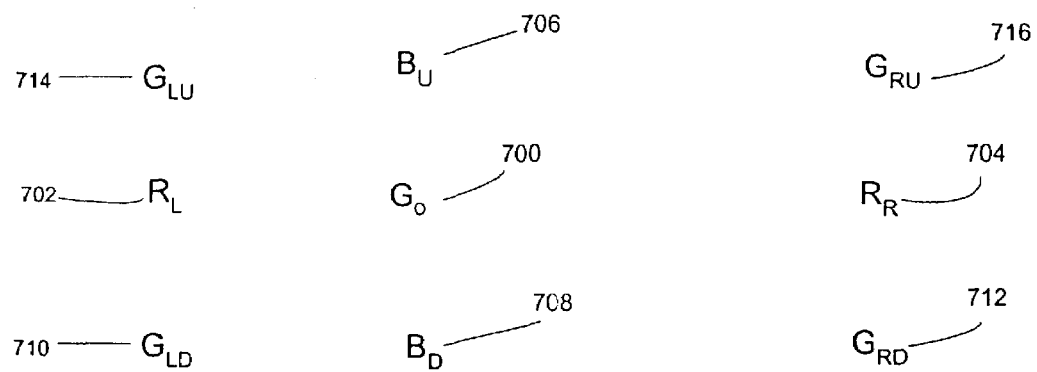
FIG. 7 is a map of the labels provided to photodetectors adjacent a photodetector sensing blue light in the map of FIG. 3.

$R_{horz}$ is the percentage of photocharges from photodetectors sensing red light that travel in the horizontal direction. The value of $R_{horz}$ may be determined in any one of various ways, such as statistically or by a calibration process. RL is the actual measured value of a photodetector sensing red light to the left of the photodetector at issue, i.e. the photodetector sensing red light in an odd row of the array shown in FIG. 3. A map of the placement of a photodetector $G_o$ 700 sensing green light and adjoining photodetectors with respect to it is illustrated in FIG. 7. The map illustrates the position of a photodetector labeled $R_L$ 702 with respect to photodetector $G_o$ 700. $R_L$ 702 is the photodetector sensing red light to the left of, or west of, the photodetector $G_o$ 700 sensing green light. Similarly, RR is the actual measured value of the photodetector sensing red light to the right of, or east of, photodetector $G_o$ 700. The position of that photodetector, labeled $R_R$ 704, with respect to photodetector $G_o$ 700 is also shown in FIG. 7.

$B_{vert}$ is the percentage of photocharges from photodetectors sensing blue light that travel in the vertical direction. The value of $B_{vert}$ may be determined in any one of various ways, such as statistically or by a calibration process. BU is the measured value of a photodetector $B_U$ 706 sensing blue light to the north of photodetector $G_o$ 700 as shown in the map of FIG. 7. Similarly, BD is the measured value of a photodetector BD 708 sensing blue light to the south of photodetector $G_o$ 700 as shown in the map of FIG. 7.

$G_{diag}$ is the percentage of photocharges from photodetectors sensing green light that travel in the diagonal direction. The value of $G_{diag}$ may also be determined in any one of various ways, such as statistically or by a calibration procedure. GLD is the measured value of a photodetector, labeled $G_{LD}$ 710, sensing green light to the south-west of photodetector $G_o$ 700 as shown in the map of FIG. 7. Similarly, GRD is the measured value of a photodetector labeled $G_{RD}$ 712 sensing green light to the south-east of photodetector $G_o$ 700 as shown in the map of FIG. 7. GLU and GRU are the measured values of photodetectors labeled $G_{LU}$ 714 and $G_{RU}$ 716 respectively in the map of FIG. 7. As shown, photodetectors $G_{LU}$ 714 and $G_{RU}$ 716 are positioned to the north-west and north-east, respectively, of photodetector $G_o$ 700.

$G_{horz}$, $G_{vert}$ and $G_{diag}$ are the percentage of photocharges from photodetectors sensing green light that travel in the horizontal, vertical and diagonal directions respectively. Their values may also be determined in any one of various, such as statistically or by a calibration process.

Based on the respective values of the variables, a cross-talk adjusted value of a photodetector sensing green light in an odd row of the array shown in FIG. 3 may be determined by the $G_{oadjusted}$ method provided. In the method, the measured value of the photodetector labeled $G_o$ is determined. From this value, a cross-talk gain factor is subtracted. The cross-talk gain factor includes horizontal cross-talk gain interference, vertical cross-talk gain interference and diagonal cross-talk gain interference. Horizontal cross-talk gain interference includes the percentage of photocharges from photodetectors sensing a particular color of light, such as red light, that travel in the horizontal direction multiplied by each of the measured values of the photodetector sensing that particular color of light to the west of the photodetector sensing green light in an odd row, and the photodetector sensing that particular color of light to the east of the photodetector sensing green light in an odd row. The vertical cross-talk gain interference includes the percentage of photocharges from photodetectors sensing a particular color of light, such as blue light, that travel in the vertical direction multiplied by each of the measured values of the photodetector sensing that particular color of light to the north of the photodetector sensing green light in an odd row, and the photodetector sensing that particular color of light to the south of the photodetector sensing green light in an odd row. The diagonal cross-talk gain interference includes the percentage of photocharges from photodetectors sensing a particular color of light, such as green light, that travel in the diagonal direction multiplied by each of the measured values of the photodetector sensing that particular color of light to the south-west of the photodetector sensing green light in an odd row, the photodetector sensing that particular color of light to the south-east of the photodetector sensing green light in an odd row, the photodetector sensing that particular color of light to the north-west of the photodetector sensing green light in an odd row, and the photodetector sensing that particular color of light to the north-east of the photodetector sensing green light in an odd row.

A value obtained by subtracting the cross-talk gain factor from the measured value of the photodetector sensing green light in an odd row is factored by a cross-talk loss normalization factor. The cross-talk loss normalization factor comprises of the sum of a horizontal cross-talk loss factor, a vertical cross-talk loss factor and a diagonal cross-talk loss factor, subtracted from 1. The horizontal cross-talk loss factor is twice the value of the percentage of photocharges from photodetectors sensing green light that travel in the horizontal direction. The vertical cross-talk loss factor is twice the value of the percentage of photocharges from photodetectors sensing green light that travel in the vertical direction. The diagonal cross-talk loss factor is four times the value of the percentage of photocharges from photodetectors sensing green light that travel in the diagonal direction. The cross-talk adjusted value thus obtained after factoring by the cross-talk loss normalization factor is the final cross-talk adjusted value for the signal from the photodetector sensing green light in an odd row.

Accordingly, a signal generated by a photodetector sensing green light in an odd row may be cross-talk adjusted to yield an improved signal indicative of the incident photon radiation upon the photodetector.

The cross-talk adjustment methods adjust both loss and gain of photo-charges to and from a photodetector. Accordingly, these methods do not require separate or multiple methods for gain and loss of photo-charges in a photodetector to help reduce the effects of cross-talk during operation.

Figure 8:
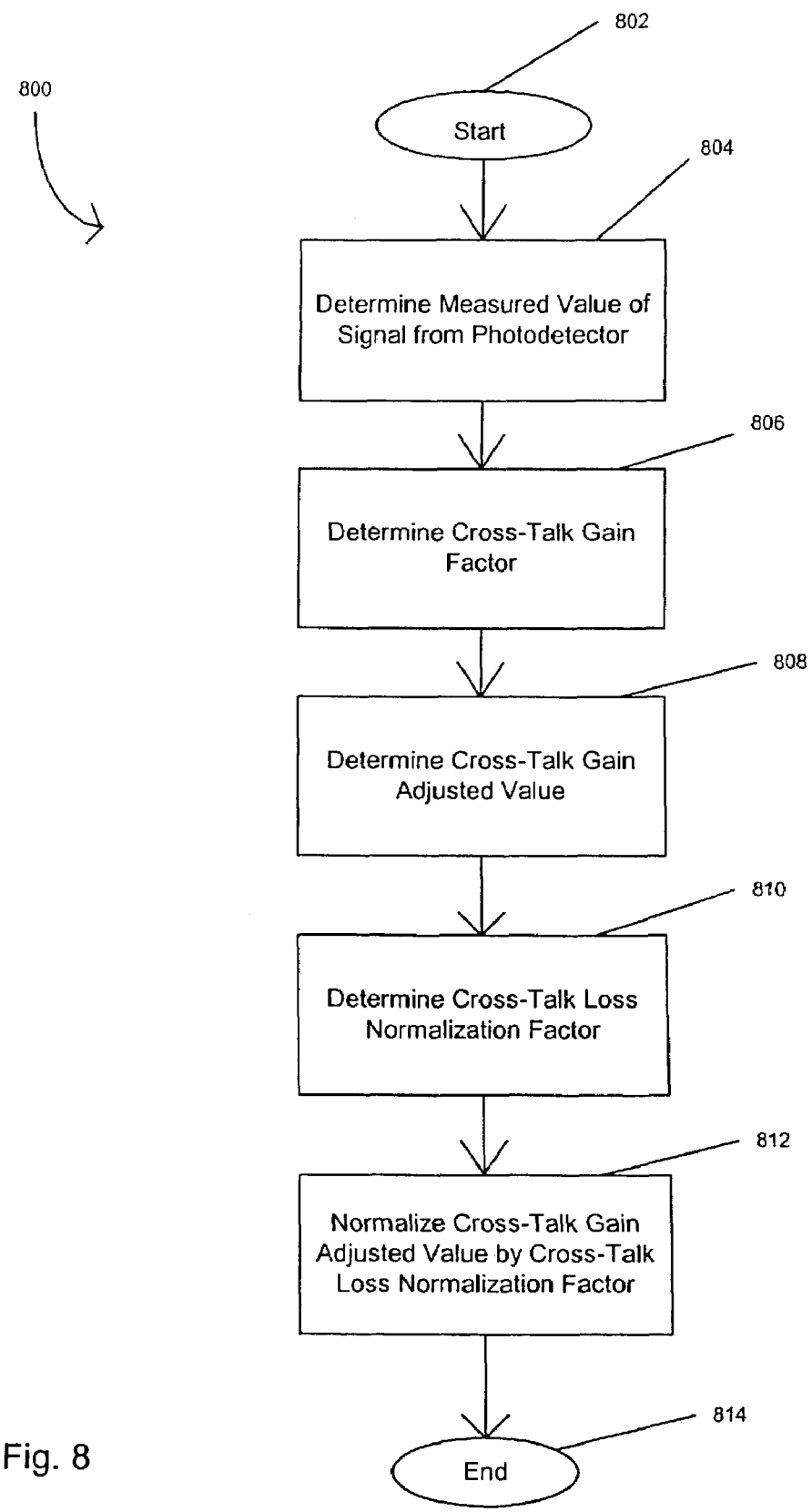
FIG. 8 is a flowchart illustrating a method of cross-talk adjusting the value of a signal from a photodetector.

Referring to FIG. 8, a flowchart 800 illustrating the method of cross-talk adjusting a signal from a particular photodetector is shown. The process 800 begins at 802. At 804, a measured value of a signal from the particular photodetector is determined. This measured value will typically be cross-talk corrupted. At 806, a cross-talk gain factor is determined. At 808, a cross-talk gain adjusted value is determined. In one implementation, the cross-talk gain adjusted value is determined by subtracting the cross-talk gain factor determined at 806 from the measured value of the signal from the particular photodetector determined at 804. At 810, a cross-talk loss normalization factor is determined. At 812, the cross-talk gain adjusted value determined at 808 is normalized by the cross-talk loss normalization factor determined at 810, which provides a cross-talk adjusted value for the particular photodetector. The method illustrated by flowchart 800 then ends at 814.

Figure 9:
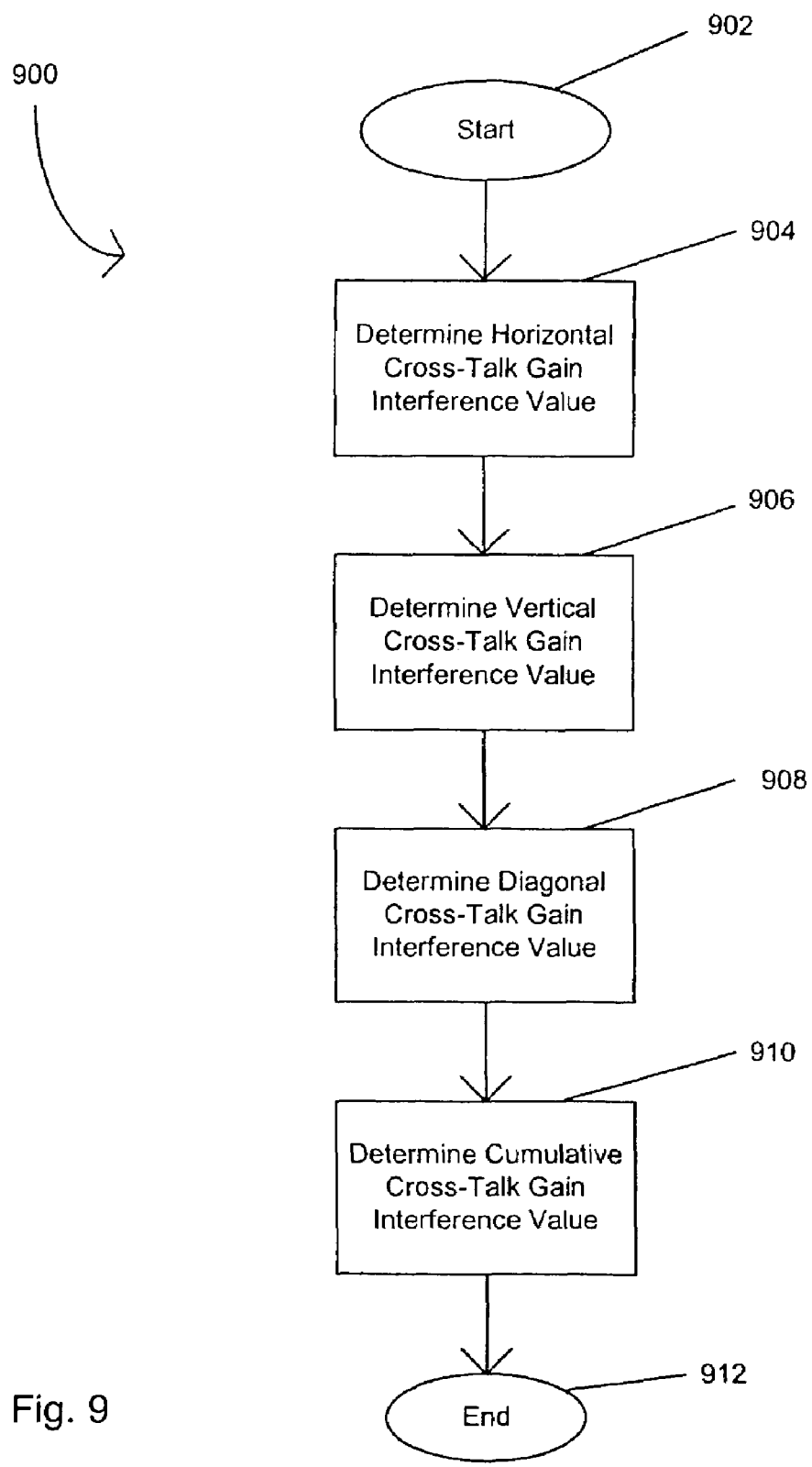
FIG. 9 is a flowchart illustrating the method of determining a cross-talk gain factor for use in the method of FIG. 8.

Referring to FIG. 9, a flowchart 900 illustrating the method of determining a cross-talk gain factor, for example at 806 in FIG. 8, is shown. The method 900 begins at 902. At 904, a horizontal cross-talk gain interference value is determined. In one implementation, the horizontal cross-talk gain interference value is determined by multiplying the percentage of photocharges from photodetectors sensing the color of light that the particular photodetectors positioned horizontally with respect to the particular photodetector sense that travel in the horizontal direction, by the measured values of the photodetectors positioned horizontally with respect to the particular photodetector. At 906, a vertical cross-talk gain interference value is determined. In one implementation, the vertical cross-talk gain interference value is determined by multiplying the percentage of photocharges from photodetectors sensing the color of light that the particular photodetectors positioned vertically with respect to the particular photodetector sense that travel in the vertical direction, by the measured values of the photodetectors positioned vertically with respect to the particular photodetector. At 908, a diagonal cross-talk gain interference value is determined. In one implementation, the diagonal cross-talk gain interference value is determined by multiplying the percentage of photocharges from photodetectors sensing the color of light that the particular photodetectors positioned diagonally with respect to the particular photodetector sense that travel in the diagonal direction, by the measured values of the photodetectors positioned diagonally with respect to the particular photodetector. At 910, a cumulative cross-talk gain interference value is determined. In one implementation, the cumulative cross-talk gain interference value is determined by adding together the determined values of the horizontal cross-talk gain interference, the vertical cross-talk gain interference and the diagonal cross-talk gain interference. The cumulative cross-talk gain interference value is the cross-talk gain factor usable at 806 in the method illustrated by flowchart 800 shown in FIG. 8. The method illustrated by flowchart 900 then ends at 912.

Figure 10:
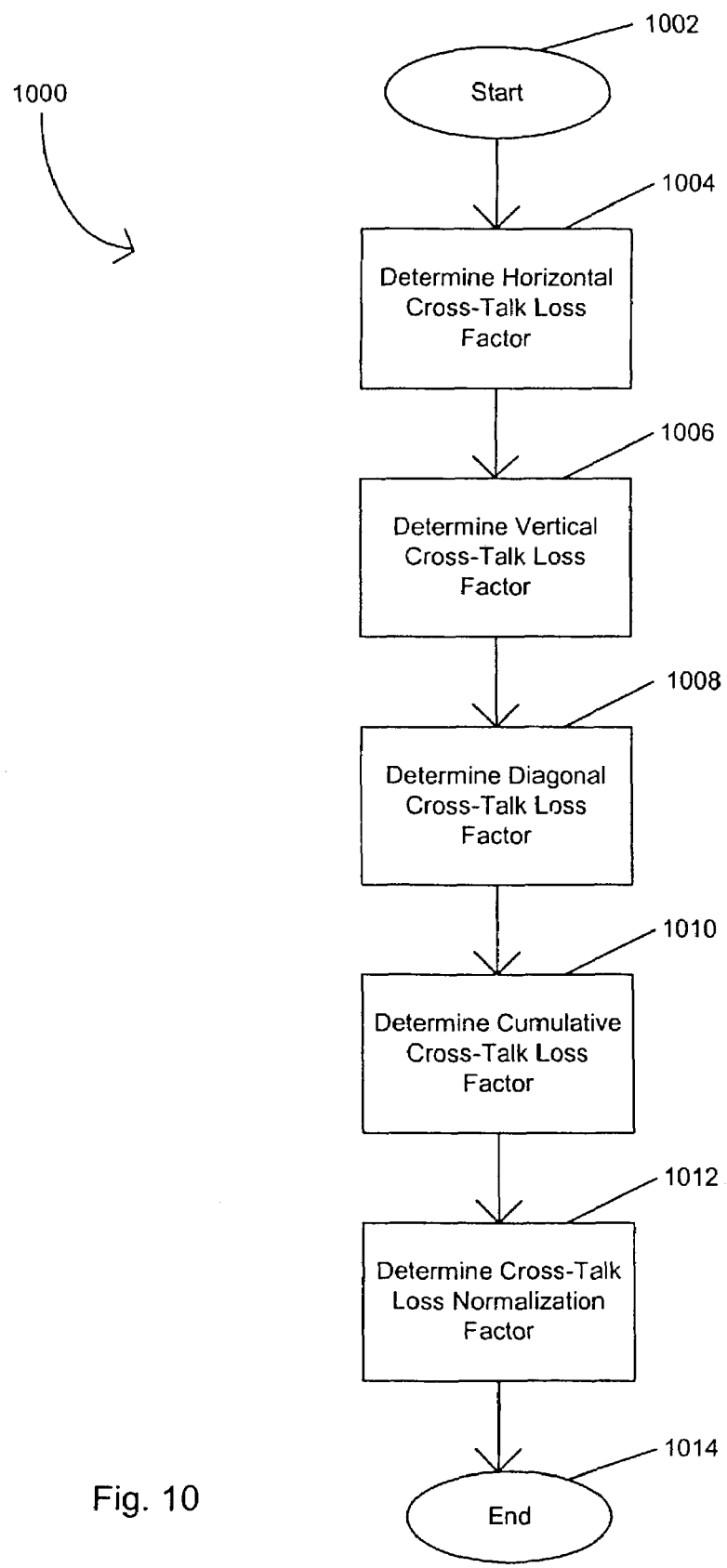
FIG. 10 is a flowchart illustrating the method of determining a cross-talk normalization factor for use in the method of FIG. 9.

Referring to FIG. 10, a flowchart 1000 illustrating the method of determining a cross-talk loss normalization factor, for example at 810 in FIG. 8, is shown. The method 1000 begins at 1002. At 1004, a horizontal cross-talk loss factor is determined. In one implementation, the horizontal cross-talk loss factor is twice the percentage of photocharges from photodetectors sensing the color of light that the particular photodetector senses that travel in the horizontal direction. At 1006, a vertical cross-talk loss factor is determined. In one implementation, the vertical cross-talk loss factor is twice the percentage of photocharges from photodetectors sensing the color of light that the particular photodetector senses that travel in the vertical direction. At 1008, a diagonal cross-talk loss factor is determined. In one implementation, the diagonal cross-talk loss factor is four times the percentage of photocharges from photodetectors sensing the color of light that the particular photodetector senses that travel in the diagonal direction.

At 1010, a cumulative cross-talk loss factor is determined. In one implementation, the cumulative cross-talk factor is determined by adding together the values of the horizontal cross-talk loss factor, the vertical cross-talk loss factor and the diagonal cross-talk loss factor. At 1012, a cross-talk loss normalization factor is determined. In one implementation, the cross-talk loss normalization factor is determined by subtracting from 1 the cumulative cross-talk loss factor determined at 1010. The method illustrated by flowchart 1000 then ends at 1014.

Photodetectors at the edges of an array of photodetectors, such as the array of photodetectors shown in FIG. 1, usually do not have adjacent photodetectors in one or more directions. In such event, not all values required in the determination of the respective cross-talk adjustment method will exist because of the absence of adjacent photodetectors corresponding to one or more of those values. In such case, the values of signals from the absent photodetectors may simply be substituted as zero in the method in one implementation of the invention. In other implementations, however, the values for the absent photodetectors may be substituted with other values, such as by wrapping around the array and inputting the values of signals from the photodetectors at the opposite edge of the array, and the like. Accordingly, the values of absent photodetectors may be provided in a cross-talk adjustment method in any predetermined manner, which may vary from one implementation to another.

A different scheme of colors may be utilized instead of three colors consisting of red, green and blue in other implementations of the invention. Such different scheme may have a different number of colors, or a different combination of colors, which may be utilized in that implementation of the invention. The implementation having a three-color scheme of red, green and blue is provided to help illustrate an example implementation of the invention. However, the methods may be modified according to the particular implementation, including the number of colors and their particular combination, and the invention will similarly be applicable to such other color schemes.

In the methods discussed, the true, or non-cross-talk corrupted, values of signals from adjacent photodetectors are utilized to cross-talk adjust a signal from a photodetector. Initially, however, when the signal from the first photodetector is cross-talk adjusted, the values of signals from adjacent photodetectors will be cross-talk corrupted because their values have yet to be cross-talk adjusted. Accordingly, the cross-talk corrupted values' of the signals from adjacent photodetectors are utilized in the cross-talk adjustment of the signal from the first photodetector. During the cross-talk adjustment determination of the second photodetector, the cross-talk adjusted value of the signal from the first photodetector will be available, although only cross-talk corrupted values of signals from the other adjacent photodetectors will be available. Therefore, the already determined cross-talk adjusted value of the signal from that first photodetector may be utilized in the cross-talk adjustment of the signal from the second photodetector. Using the cross-talk adjusted value of the signal from the first photodetector will provide an improved cross-talk adjusted value for the second photodetector than if the cross-talk corrupted value of the signal from the first photodetector were to be utilized instead. Similarly, the cross-talk adjusted values of the signals from the first two photodetectors may be utilized in subsequently determining a cross-talk adjusted value of a third photodetector to yield an improved cross-talk adjusted value for the third photodetector, and so on. Accordingly, subsequent cross-talk adjusted values of signals from photodetectors using the methods discussed will have a higher amount of accuracy associated with them if the already determined cross-talk adjusted values of signals from adjacent photodetectors are utilized instead of their cross-talk corrupted values in subsequent cross-talk adjustment determinations, because the values used in the determination will already be cross-talk adjusted.

The sequence of cross-talk adjustment of signals from photodetectors may vary according to the implementation of the invention. For example, in one implementation the signals from the photodetectors may be cross-talk adjusted in a particular order according to the physical location of the photodetectors in photosensor 100 (shown in FIGS. 1 and 2). In another implementation, signals from all photodetectors sensing one color of light, such as blue light, may be cross-talk adjusted first, followed by all signals from photodetectors sensing another color of light, such as green light, and so forth. Accordingly, the particular order of cross-talk adjustment of signals from the photodetectors will typically vary according to the particular implementation of the invention.

In one implementation of a photosensor 102 having the order of color filters as shown in FIG. 3, the photodetectors that sense red light are cross-talk adjusted first. Since photodetectors sensing red light lose the greatest number of photo-charges to adjacent photodetectors and receive the least number of photo-charges from adjacent photodetectors, the photodetectors that sense red light are the most independent of the photodetectors that sense either red, blue or green light. For this reason, it is preferable to cross-talk adjust signals from photodetectors that sense red light first. Conversely, photosensors that sense blue light lose the least number of photo-charges to adjacent photodetectors and receive the greatest number of photo-charges from adjacent photodetectors, whereby the photodetectors that sense blue light are the most dependent of the photodetectors that sense either red, blue or green light. For this reason, it is preferable to cross-talk adjust photodetectors that sense blue light last. Accordingly, a preferred sequence of cross-talk adjustment of signals from photodetectors in the implementation shown in FIG. 3 is red-green-blue (or R-G-B).

In the implementation shown in FIG. 3 photodetectors sensing green light make up half of the total number of photodetectors. Because of the characteristics of the human eye, cross-talk adjustment of these photodetectors that sense green light is the most important of the photodetectors that sense either red, green or blue light. In this regard, it may be advantageous to cross-talk adjust signals from photodetectors that sense green light last in an alternate implementation of the invention. The sequence of cross-talk adjustment of signals from photodetectors in such implementation would therefore be red-blue-green (or R-B-G). Although the R-G-B order produces the overall best results, the R-B-G order produces overall results almost as good as the R-G-B order, but with the advantage of having the lowest error value in photodetectors that sense green light (which is half of the total number of photodetectors). Accordingly, the R-B-G order may be preferable over the R-G-B order in an alternate implementation of the invention.

In another implementation of the invention, look-up tables may be utilized to reduce the amount of calculations required in the methods during cross-talk adjustment of signals from the photodetectors. For instance, in the method for cross-talk adjusting a signal from a photodetector sensing red light, the values of $G_{horz}$*GL, $G_{vert}$*GU, $B_{diag}$*BLU, etc., will be available in look-up tables and they would not have to be determined each time a signal from that photodetector, or a signal from any photodetector sensing red light, is cross-talk adjusted. In one implementation, for example, the values of GL, GU, BLU, etc. are each 10-bit values. In such implementation, they will be one of ($2^{10}$=1024) 1024 discrete values. Depending on the value of $G_{horz}$, which is determined by any one of various ways such as statistically or by a calibration process, a look-up table having 1024 values may be generated in which each value corresponds to the value of $G_{horz}$ multiplied by a discrete value between 0 and 1023. Accordingly, once the look-up table for the particular value of $G_{horz}$ has been created, the value of $G_{horz}$*GL may be retrieved from the look-up table, based upon the value of GL, each time a value for it has to be determined. The value of GL must be one of the 1024 values for which a corresponding value will already exist in the look-up table because GL is a 10-bit value and therefore can have only one of 1024 possible values. Therefore, the need for performing the calculation during the cross-talk adjustment method is eliminated.

Similarly, nine look-up tables having 1024 values each may be created for $G_{horz}$, $G_{vert}$, $G_{diag}$, $B_{horz}$, $B_{vert}$, $B_{diag}$, $R_{horz}$, $R_{vert}$ and $R_{diag}$. Accordingly, determining a cross-talk adjusted value of a signal from a photodetector by utilizing the methods discussed will comprise retrieving the respective values from the look-up tables and using them in the method, which will save a considerable number of multiplication calculations each time a signal from a photodetector is cross-talk adjusted.

In other implementations, a different number of lookup-tables may be utilized. In one implementation, for example, there are only seven look-up tables for $G_{vert}$, $G_{diag}$, $B_{horz}$, $R_{horz}$, $R_{vert}$ and $R_{diag}$. In other words, there are no look-up tables for $B_{vert}$ or $B_{diag}$. Red light typically has the longest wavelength in the visible spectrum of light, whereas green light is in approximately the middle of the visible spectrum of light and therefore has an intermediate length wavelength. Blue light, on the other hand, typically has the shortest wavelength. Photocharges from light having longer wavelengths typically travel deeper into photodetectors, and therefore have a greater probability of cross-talk with adjoining photodetectors, and vice versa. Accordingly, photodetectors sensing blue light will have the least amount of cross-talk with adjoining photodetectors. Because the distance between photodetectors positioned diagonally with respect to each other is typically greater than the distance between photodetectors positioned vertically or horizontally with respect to each other, there is less cross-talk between photodetectors positioned diagonally with respect to each other. A barrier between photodetectors positioned vertically with respect to each other in the example implementation, such as a metal line between each row of photodetectors, decreases the amount of cross-talk between photodetectors positioned vertically with respect to each other. Accordingly, cross-talk with photodetectors positioned horizontally with respect to a photodetector sensing blue light will be the only cross-talk of significant concern when cross-talk adjusting signals from the photodetectors. Therefore, in such example implementation, the values of $B_{vert}$ and $B_{diag}$ will be negligible, whereby separate look-up tables for them will not be necessary. Thus, other example implementations of the invention can eliminate, or add, other look-up tables for comparable reasons.

The methods discussed will typically be executed by a processor 106, such as a signal processor, a microprocessor, or some other processing means associated with the electronic imaging device 100. Processor 106 will typically be capable of receiving, processing and outputting signals. Processor 106 may also include other hardware and associated electronic circuitry such as input/output circuitry, analog circuits, programmed logic arrays, and data storage means such as associated memory or other computer readable media. Further, the methods will typically be implemented in software associated with processor 106 in any manner know in the art.

While various implementations of the application have been described, it will be apparent to those of ordinary skill in the art that many more implementations and implementations are possible that are within the scope of this invention. Accordingly, the invention is not to be restricted except in light of the attached claims and their equivalents.

I claim:

1. A system for reducing cross-talk in a photosensor, comprising:
   a first photodetector;
   a plurality of adjacent photodetectors adjacent to the first photodetector;
   a cross-talk adjustment device in signal communication with the first photodetector and the plurality of adjacent photodetectors;
   wherein the cross-talk adjustment device is operable to generate a cross-talk adjusted value from the first photodetector based upon signals from the plurality of adjacent photodetectors, and wherein the cross-talk adjusted value is determined by determining a cross-talk gain factor, determining a cross-talk gain adjusted value, determining a cross-talk loss normalization factor, and normalizing the cross-talk gain adjusted value by the cross-talk loss normalization factor.

2. The system of claim 1 wherein the plurality of photodetectors are positioned in an array structure.

3. The system of claim 1 wherein the cross-talk adjustment device is operable to cross-talk adjust the signal from the first photodetector based upon a percentage of photocharges that leak from one of the plurality of adjacent photodetectors in a horizontal direction.

4. The system of claim 1 wherein the cross-talk adjustment device is operable to cross-talk adjust the signal from the first photodetector based upon a percentage of photocharges that leak from one of the plurality of adjacent photodetectors in a vertical direction.

5. The system of claim 1 wherein the cross-talk adjustment device is operable to cross-talk adjust the signal from the first photodetector based upon a percentage of photocharges that leak from one of the plurality of adjacent photodetectors in a diagonal direction.

6. The system of claim 1 further comprising a filter associated with each photodetector, wherein each filter is operable to filter out light and allow only one color of light to be received by its respective photo detector.

7. A method for adjusting cross-talk in a first photodetector signal from a first photodetector, comprising:
   measuring a first value of the first photodetector signal;
   measuring a plurality of adjacent values of a plurality of adjacent photodetector signals from a plurality of photodetectors adjacent to the first photodetector; and
   generating a cross-talk adjusted value of the first photodetector signal based upon the first value and the plurality of adjacent values;
   wherein the cross-talk adjusted value is determined by determining a cross-talk gain factor, determining a cross-talk gain adjusted value, determining a cross-talk loss normalization factor, and normalizing the cross-talk gain adjusted value by the cross-talk loss normalization factor.

8. The method of claim 7, wherein determining the cross-talk gain factor comprises:
   determining a horizontal cross-talk gain interference value;
   determining a vertical cross-talk gain interference value; and
   determining a diagonal cross-talk gain interference value.

9. The method of claim 8, wherein the horizontal cross-talk gain interference value is determined by multiplying the percentage of photocharges from photodetectors sensing a color of light that the first photodetector senses that travel in a horizontal direction, by the measured values of photodetectors positioned horizontally with respect to the first photodetector.

10. The method of claim 8, wherein the vertical cross-talk gain interference value is determined by multiplying the percentage of photocharges from photodetectors sensing a color of light that the first photodetector senses that travel in a vertical direction, by the measured values of photodetectors positioned vertically with respect to the first photodetector.

11. The method of claim 8, wherein the diagonal cross-talk gain interference value is determined by multiplying the percentage of photocharges from photodetectors sensing a color of light that the first photodetector senses that travel in a diagonal direction, by the measured values of photodetectors positioned diagonally with respect to the first photodetector.

12. The method of claim 8, wherein determining the cross-talk gain factor further comprises determining a cumulative cross-talk gain interference value.

13. The method of claim 12, wherein the cumulative cross-talk gain interference value is determined by adding the horizontal cross-talk gain interference value, the vertical cross-talk gain interference value and the diagonal cross-talk gain interference value.

14. The method of claim 7 wherein the cross-talk gain adjusted value is determined by subtracting the cross-talk gain factor from the first value.

15. The method of claim 7, wherein the cross-talk loss normalization factor is determined by:
   determining a cumulative cross-talk loss factor; and
   subtracting the cumulative cross-talk loss factor from 1.

16. The method of claim 15, wherein determining the cumulative cross-talk loss factor comprises:
   determining a horizontal cross-talk loss factor;
   determining a vertical cross-talk loss factor; and
   determining a diagonal cross-talk loss factor.

17. The method of claim 16, wherein the cumulative cross-talk loss factor is determined by adding the horizontal cross-talk loss factor, the vertical cross-talk loss factor and the diagonal cross-talk loss factor.

18. The method of claim 16, wherein the horizontal cross-talk loss factor is twice the value of the percentage of photocharges from photodetectors sensing a color of light that the first photodetector senses that travel in a horizontal direction.

19. The method of claim 17, wherein the vertical cross-talk loss factor is twice the value of the percentage of photocharges from photodetectors sensing a color of light that the first photodetector senses that travel in a vertical direction.

20. The method of claim 17, wherein the diagonal cross-talk loss factor is four times the value of the percentage of photocharges from photo detectors sensing a color of light that the first photodetector senses that travel in a diagonal direction.

21. The method of claim 7, wherein normalizing the cross-talk gain adjusted value by the cross-talk loss normalization factor comprises dividing the cross-talk gain adjusted value by the cross-talk loss normalization factor.

22. A computer readable medium having encoded thereon software for execution by a processor to perform a method for adjusting a first value of a first signal from a first photodetector for cross-talk from a plurality of adjacent photodetectors adjacent to the first photodetector, the method comprising:
   measuring the first value or the first signal from the first photodetector;
   measuring values of a plurality of adjacent signals from the plurality of adjacent photo detectors;
   generating a cross-talk adjusted value of the first signal based on the first value and at least one of the plurality of adjacent signals;
   wherein the cross-talk adjusted value is determined by determining a cross-talk gain factor, determining a cross-talk gain adjusted value, determining a cross-talk loss normalization factor, and normalizing the cross-talk gain adjusted value by the cross-talk loss normalization factor.

23. The computer readable medium of claim 22, wherein the determining the cross-talk gain factor comprises:
   determining a horizontal cross-talk gain interference value;
   determining a vertical cross-talk gain interference value; and
   determining a diagonal cross-talk gain interference value.

24. The computer readable medium of claim 23, wherein the determining the horizontal cross-talk gain interference value comprises multiplying the percentage of photocharges from photodetectors sensing a color of light that the first photodetector senses that travel in a horizontal direction, by the measured values of photodetectors positioned horizontally with respect to the first photodetector.

25. The computer readable medium of claim 23, wherein the determining the vertical cross-talk gain interference value comprises multiplying the percentage of photocharges from photodetectors sensing a color of light that the first photodetector senses that travel in a vertical direction, by the measured values of photodetectors positioned vertically with respect to the first photodetector.

26. The computer readable medium of claim 23, wherein the determining the diagonal cross-talk gain interference value comprises multiplying the percentage of photocharges from photodetectors sensing a color of light that the first photodetector senses that travel in a diagonal direction, by the measured values of photodetectors positioned diagonally with respect to the first photodetector.

27. The computer readable medium of claim 23, wherein the determining the cross-talk gain factor further comprises determining a cumulative cross-talk gain interference value.

28. The computer readable medium of claim 27, wherein the determining the cumulative cross-talk gain interference value comprises adding the horizontal cross-talk gain interference value, the vertical cross-talk gain interference value and the diagonal cross-talk gain interference value.

29. The computer readable medium of claim 22, wherein the determining the cross-talk gain adjusted value comprises subtracting the cross-talk gain factor value from the first value.

30. The computer readable medium of claim 22, wherein the determining the cross-talk loss normalization factor comprises:
   determining a cumulative cross-talk loss factor; and
   subtracting the cumulative cross-talk loss factor from 1.

31. The computer readable medium of claim 30, wherein determining the cumulative cross-talk loss factor comprises:
   determining a horizontal cross-talk loss factor;
   determining a vertical cross-talk loss factor; and
   determining a diagonal cross-talk loss factor.

32. The computer readable medium of claim 31, wherein the determining the cumulative cross-talk loss factor comprises adding the horizontal cross-talk loss factor, the vertical cross-talk loss factor and the diagonal cross-talk loss factor.

33. The computer readable medium of claim 32, wherein the determining the horizontal cross-talk loss factor comprises multiplying by two the value of the percentage of photo charges from photodetectors sensing a color of light that the first photodetector senses that travel in a horizontal direction.

34. The computer readable medium of claim 32, wherein the determining the vertical cross-talk loss factor comprises multiplying by two the value of the percentage of photocharges from photodetectors sensing a color of light that the first photodetector senses that travel in a vertical direction.

35. The computer readable medium of claim 32, wherein the determining the diagonal cross-talk loss factor comprises multiplying by four the value of the percentage of photo charges from photodetectors sensing a color of light that the first photodetector senses that travel in a diagonal direction.

36. The computer readable medium of claim 22, wherein the normalizing the cross-talk gain adjusted value by the cross-talk loss normalization factor comprises dividing the cross-talk gain adjusted value by the cross-talk loss normalization factor.

37. A device comprising:
   a first photodetector generating a first signal;
   a plurality of second photodetectors, each of the plurality of second photodetectors generating a second signal, each of the plurality of second photodetectors being adjacent to the first photodetector;
   a processor configured to measure a first value from the first signal and a second value from each second signal and to generate a cross-talk adjusted value for the first photodetector based on the first value and the second values, wherein the processor generates the cross-talk adjusted value by determining a cross-talk gain factor, a cross-talk gain adjusted value and a cross-talk loss normalization factor, and by normalizing the cross-talk gain adjusted value by the cross-talk loss normalization factor.

38. The device of claim 37, wherein the processor determines the cross-talk gain factor by determining a horizontal cross-talk gain interference value, a vertical cross-talk gain interference value and a diagonal cross-talk gain interference value.

39. The device of claim 38, wherein the processor determines the horizontal cross-talk gain interference value by multiplying the percentage of photocharges from the plurality of second photodetectors sensing a color of light that the first photodetector senses that travel in a horizontal direction, by the measured values of the plurality of second photodetectors positioned horizontally with respect to the first photodetector.

40. The device of claim 38, wherein the processor determines the vertical cross-talk gain interference value by multiplying the percentage of photocharges from the plurality of second photodetectors sensing a color of light that the first photodetector senses that travel in a vertical direction, by the measured values of the plurality of second photodetectors positioned vertically with respect to the first photodetector.

41. The device of claim 38, wherein, the processor determines the diagonal cross-talk gain interference value by multiplying the percentage of photocharges from the plurality of second photodetectors sensing a color of light that the first photodetector senses that travel in a diagonal direction, by the measured values of the plurality of second photodetectors positioned diagonally with respect to the first photodetector.

42. The device of claim 38, wherein the processor determines the cross-talk gain factor using a cumulative cross-talk gain interference value.

43. The device of claim 42, wherein the processor determine the cumulative cross-talk gain interference value by adding the horizontal cross-talk gain interference value, the vertical cross-talk gain interference value and the diagonal cross-talk gain interference value.

* * * * *

UNITED STATES PATENT AND TRADEMARK OFFICE
CERTIFICATE OF CORRECTION

| | | |
|---|---|---|
| PATENT NO. | : 7,170,555 B1 | Page 1 of 1 |
| APPLICATION NO. | : 10/417310 | |
| DATED | : January 30, 2007 | |
| INVENTOR(S) | : Brent McCleary | |

It is certified that error appears in the above-identified patent and that said Letters Patent is hereby corrected as shown below:

In the claims, column 17, line 56, claim 18, "claim 16" should be changed to --claim 17--.

Signed and Sealed this

Thirty-first Day of July, 2007

JON W. DUDAS
*Director of the United States Patent and Trademark Office*